(12) United States Patent
Veggian et al.

(10) Patent No.: US 10,232,817 B2
(45) Date of Patent: Mar. 19, 2019

(54) VEHICLE SEAT SIDE AIR BAG ASSEMBLY

(71) Applicant: Ford Global Technologies, LLC, Dearborn, MI (US)

(72) Inventors: Eric D. Veggian, Superior Township, MI (US); Brian Robert Spahn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/601,241

(22) Filed: May 22, 2017

(65) Prior Publication Data

US 2017/0259771 A1 Sep. 14, 2017

Related U.S. Application Data

(62) Division of application No. 15/067,475, filed on Mar. 11, 2016, now Pat. No. 9,694,778.

(51) Int. Cl.
| | |
|---|---|
| *B60R 21/207* | (2006.01) |
| *B60R 21/2165* | (2011.01) |
| *B60R 21/231* | (2011.01) |
| *B60R 21/0134* | (2006.01) |
| *B60R 21/0136* | (2006.01) |
| *B60R 21/16* | (2006.01) |

(52) U.S. Cl.
CPC ........ *B60R 21/207* (2013.01); *B60R 21/2165* (2013.01); *B60R 21/23138* (2013.01); *B60R 21/0134* (2013.01); *B60R 21/0136* (2013.01); *B60R 2021/161* (2013.01); *B60R 2021/23146* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,447,327 | A * | 9/1995 | Jarboe | B60R 21/216 |
| | | | | 280/728.3 |
| 5,601,332 | A | 2/1997 | Schultz et al. | |
| 5,899,528 | A * | 5/1999 | Rumpf | B29O 59/007 |
| | | | | 280/730.2 |
| 6,007,091 | A * | 12/1999 | Westrich | B60R 21/207 |
| | | | | 280/728.3 |
| 6,022,043 | A | 2/2000 | Harnisch et al. | |
| 6,206,410 | B1 * | 3/2001 | Brown | B60R 21/207 |
| | | | | 280/728.3 |
| 6,237,934 | B1 * | 5/2001 | Harrell | B60R 21/207 |
| | | | | 280/728.3 |
| 7,290,792 | B2 * | 11/2007 | Tracht | B60R 21/207 |
| | | | | 280/728.2 |
| 7,322,597 | B2 * | 1/2008 | Tracht | B60R 21/207 |
| | | | | 280/728.3 |

(Continued)

FOREIGN PATENT DOCUMENTS

| | | | |
|---|---|---|---|
| DE | 102006014381 A1 | 10/2007 | |
| FR | 2861352 A1 * | 4/2005 | ........... B60N 2/5883 |

*Primary Examiner* — Nicole T Verley
(74) *Attorney, Agent, or Firm* — Frank A. MacKenzie; Bejin Bieneman PLC

(57) ABSTRACT

A vehicle seat includes a frame, a cover, and a seat side airbag assembly. The seat side airbag assembly includes a chute mounted to the frame and extending to the cover. An airbag is fixed to the chute, with the chute extending between the airbag and the cover. The chute is attached to the cover.

12 Claims, 7 Drawing Sheets

(56) References Cited

U.S. PATENT DOCUMENTS

| | | | |
|---|---|---|---|
| 7,325,825 B2 | 2/2008 | Tracht | |
| 7,380,812 B2 | 6/2008 | Tracht et al. | |
| 7,478,827 B2 * | 1/2009 | Thomas | B32B 5/18 |
| | | | 280/728.3 |
| 7,695,064 B2 | 4/2010 | Thomas et al. | |
| 8,123,246 B2 * | 2/2012 | Gilbert | B60R 21/207 |
| | | | 280/728.2 |
| 8,210,567 B2 | 7/2012 | Wieczorek et al. | |
| 8,651,514 B2 * | 2/2014 | Zhang | B60R 21/2165 |
| | | | 156/160 |
| 8,662,530 B2 | 3/2014 | Festag et al. | |
| 8,794,661 B2 | 8/2014 | Cowelchuk et al. | |
| 8,944,460 B2 | 2/2015 | Mazzocchi | |
| 9,004,528 B2 | 4/2015 | Scott et al. | |
| 9,440,609 B2 | 9/2016 | Osterfeld | |
| 9,566,931 B2 * | 2/2017 | Keer | B60R 21/207 |
| 9,902,110 B2 * | 2/2018 | Magunia | B29O 65/4845 |
| 2002/0063452 A1 | 5/2002 | Harada et al. | |
| 2005/0156412 A1 | 7/2005 | Panagos et al. | |
| 2006/0113768 A1 | 6/2006 | Tracht et al. | |
| 2006/0113769 A1 | 6/2006 | Tracht | |
| 2007/0222190 A1 | 9/2007 | Tracht | |
| 2007/0222191 A1 | 9/2007 | Tracht | |
| 2009/0206581 A1 | 8/2009 | Lawall et al. | |
| 2010/0090448 A1 | 4/2010 | Pursche et al. | |
| 2010/0295282 A1 | 11/2010 | Kim et al. | |
| 2012/0038131 A1 | 2/2012 | Muller | |
| 2012/0068442 A1 | 3/2012 | Wagner | |
| 2014/0138939 A1 | 5/2014 | Scott et al. | |
| 2014/0197621 A1 | 7/2014 | Thomas | |
| 2015/0021886 A1 | 1/2015 | Osterfeld | |
| 2016/0185312 A1 | 6/2016 | Zimmerman et al. | |
| 2016/0244018 A1 | 8/2016 | Zimmerman | |
| 2017/0101074 A1 * | 4/2017 | Festag | B60R 13/0275 |

* cited by examiner

VEHICLE SEAT SIDE AIR BAG ASSEMBLY

CROSS-REFERENCE TO RELATED APPLICATIONS

The subject patent application is a divisional of and claims priority to and all the benefits of U.S. patent application Ser. No. 15/067,475 filed Mar. 11, 2016, which is herein incorporated by reference in its entirety.

BACKGROUND

Vehicles may include a variety of airbag assemblies deployable during vehicle impacts to absorb energy from occupants of the vehicles during the impact. The airbag assembly may include an airbag and an inflator in communication with an inflation chamber of the airbag. The inflator may inflate the airbag with an inflation medium to inflate the airbag from an uninflated position to an inflated position. The vehicle may include an impact sensing system in communication with the airbag assembly. The impact sensing system may sense a vehicle impact and instruct the inflator to inflate the airbag when a vehicle impact is sensed.

Vehicle seat side airbags may be deployable between an occupant and a door of a vehicle. A frame of a vehicle seat may support a seat side airbag assembly. In the uninflated position, a cover for the vehicle seat may conceal the airbag assembly. In the inflated position, the seat side airbag may deploy through the cover. The performance of seat side airbags is dependent on inflation speed. There remains an opportunity to design a vehicle seat side air bag assembly to help facilitate timely and proper deployment of the airbag.

DETAILED DESCRIPTION

Figure 1:
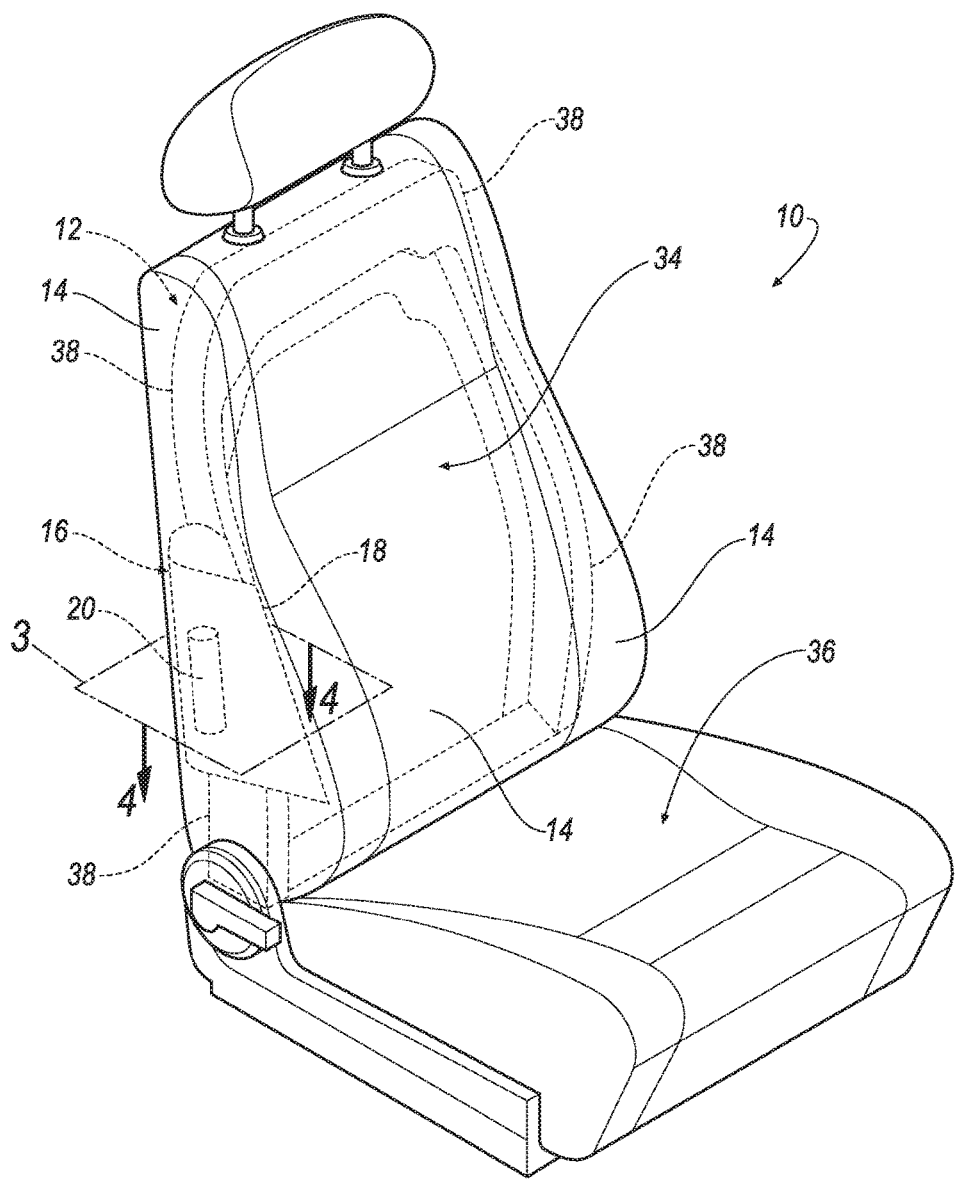
FIG. 1 is perspective view of a vehicle seat showing a frame and a seat side airbag assembly in hidden lines.

With reference to the Figures, wherein like numerals indicate like parts throughout the several views, a vehicle seat 10 may include a frame 12, a cover 14, and a seat side airbag assembly 16. The seat side airbag assembly 16 can include a chute 18. The chute 18 may be mounted to the frame 12 and extend to the cover 14. An airbag 20 may be fixed to the chute 18, with the chute 18 extending between the airbag 20 and the cover 14. The chute 18 is attached to the cover 14.

Figure 5:
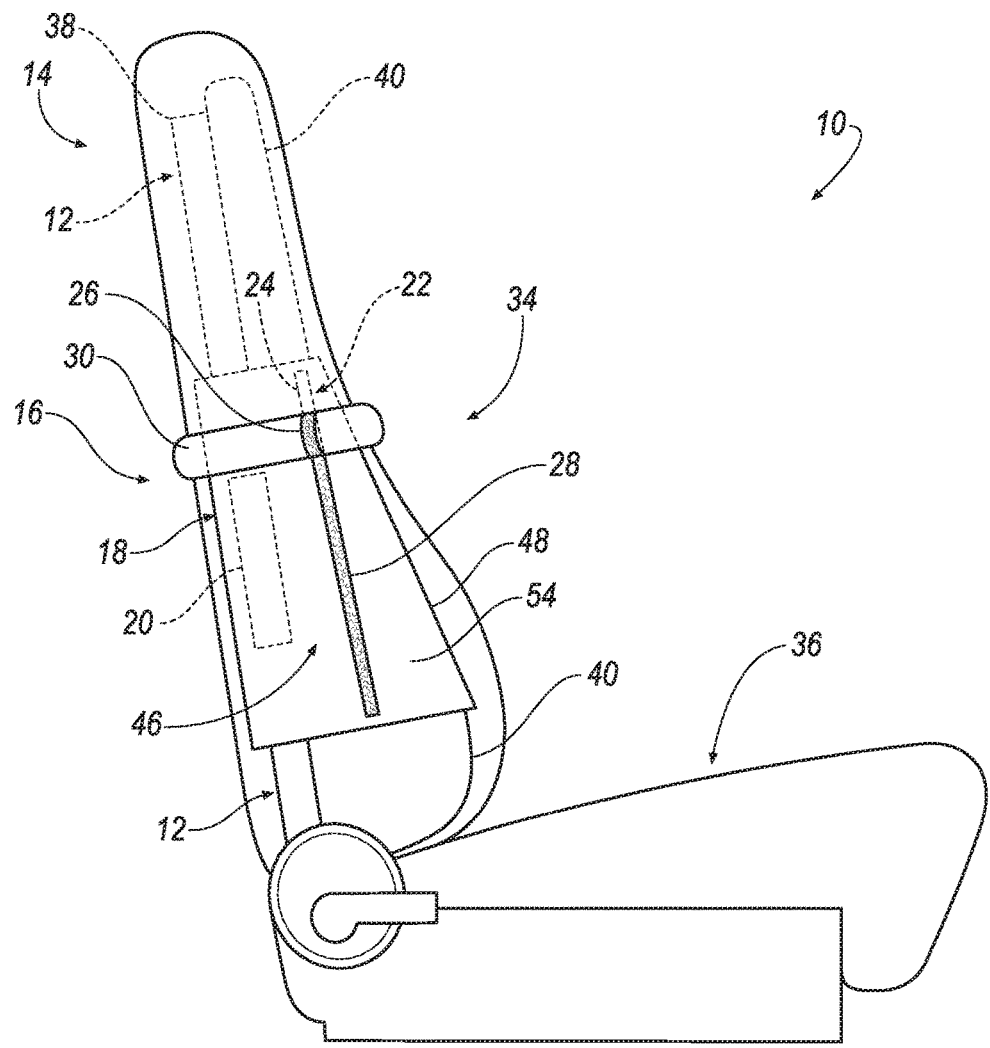
FIG. 5 is a side view of a vehicle seat showing an example of attaching a chute of a seat side airbag assembly to a cover.
Figure 6:
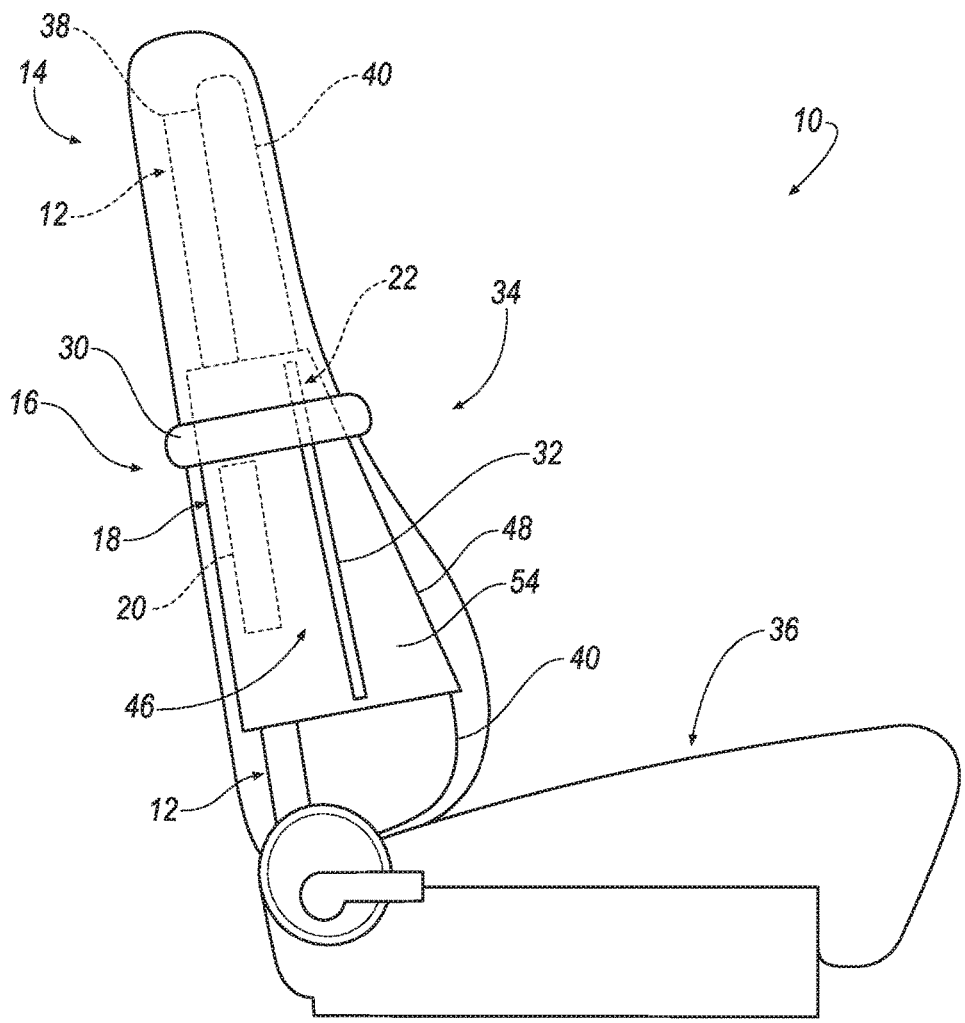
FIG. 6 is a side view of a vehicle seat showing another example of attaching a chute of a seat side airbag assembly to a cover.

The cover 14 may be configured to be rupturable relative to an attachment 22. The attachment 22 fixes the cover to the chute. For example, as shown in FIG. 5, the attachment may be a hook and loop fastener 24 including one of a hook portion 26 or a loop portion 28 secured to the chute 18, and the other portion secured to the inner surface 30 of the cover 14. Alternatively or additionally, an adhesive 32 may extend from the chute 18 to the cover 14 as shown in FIG. 6. The adhesive 32 can be of any appropriate type, including, for example, a pressure sensitive adhesive and/or a heat sensitive adhesive.

Attaching the chute 18 to the cover 14 as described above makes the cover 14 less likely to move, stretch, or otherwise delay the airbag 20 from deploying to an inflated position. In addition, the attachment 22 allows for a more flexible and cost-effective seat assembly process. For example, during the seat assembly process, the cover 14 can be rolled down to cover the frame 12 and the seat side air bag assembly 16. As the cover 14 is rolled down, the chute 18 and the inner surface 30 of the cover 14 can attach. Secondary processes to attach the chute 18 to the cover 14 can thereby be avoided.

Figure 2:
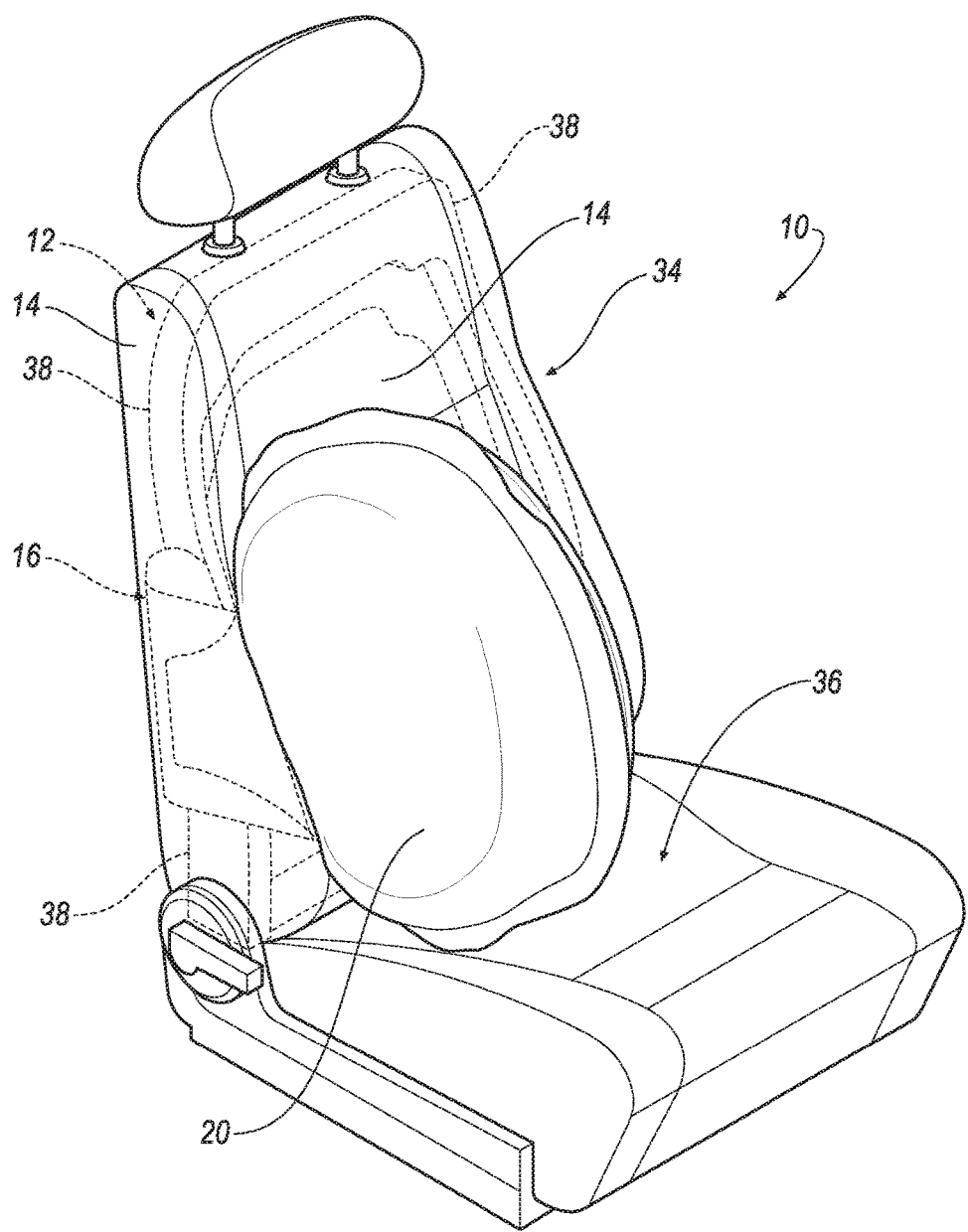
FIG. 2 is the same view of the vehicle seat shown in FIG. 1, with the airbag deployed and in an inflated position.

Referring now to FIGS. 1 and 2, the vehicle seat 10 includes a seat back 34 and a seat bottom 36. The frame 12 supports the cover 14, the chute 18, and the seat side airbag assembly 16. An upper portion 38 of the frame 12 is shown in hidden lines in FIGS. 1 and 2. The frame 12 can be formed of metal, e.g., steel, aluminum, etc., as well as other suitable materials, including plastic and/or composite materials. The frame 12 may also be formed from a combination of materials. Foam and/or other cushioning materials 40 can also be mounted on the frame 12, among other things.

Figure 3:
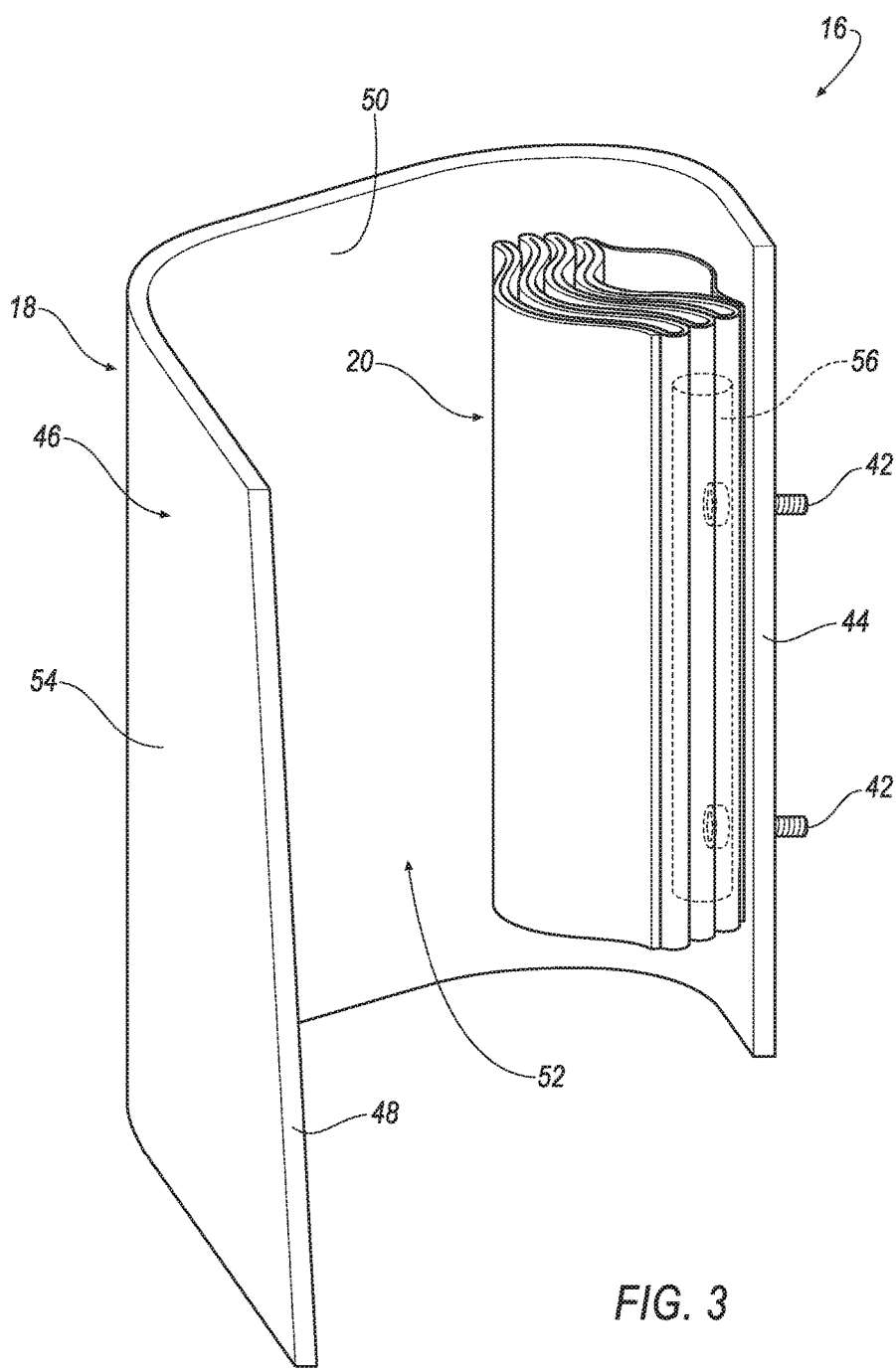
FIG. 3 is a perspective view of a seat side airbag assembly.
Figure 4:
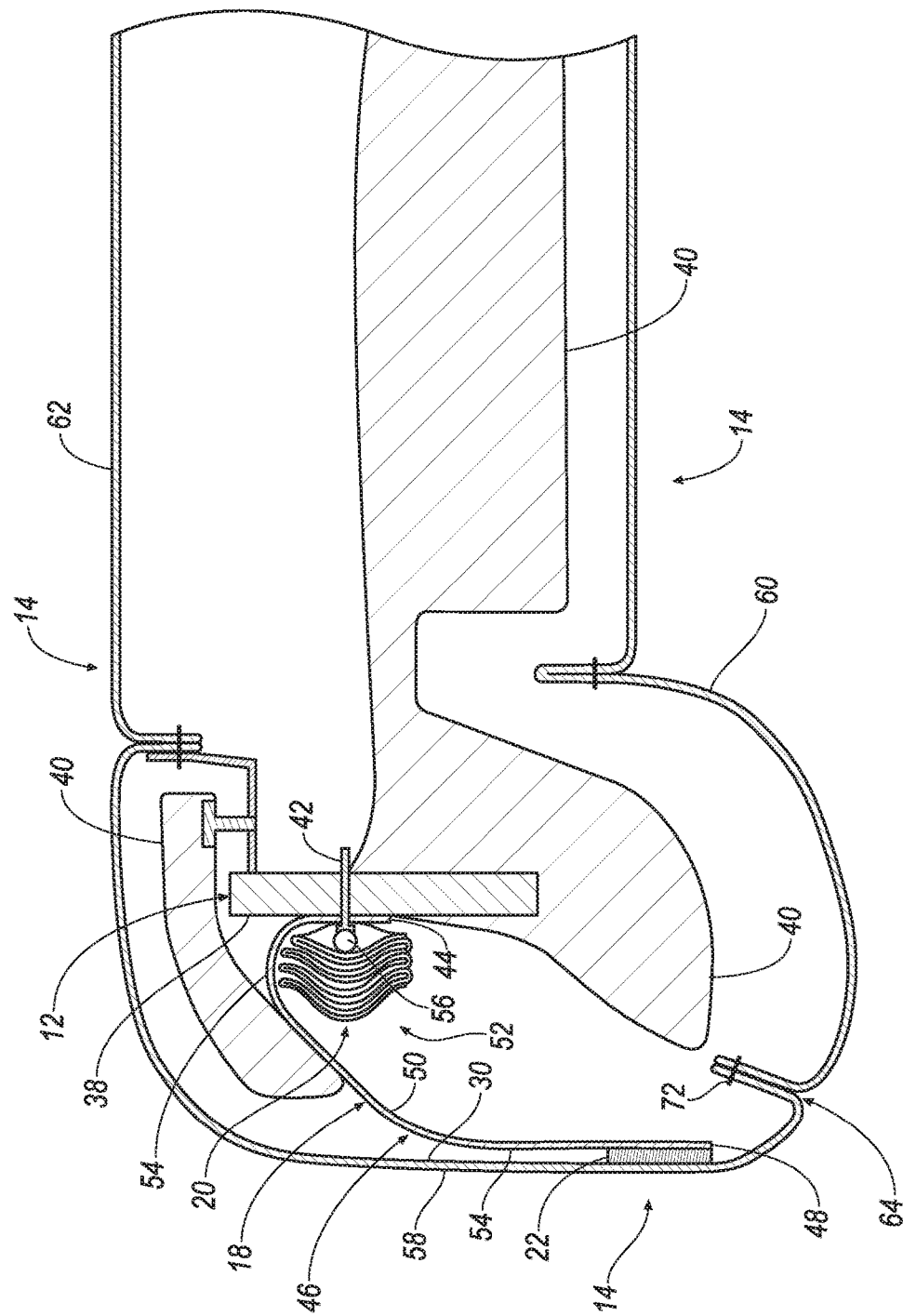
FIG. 4 is a section view of the vehicle seat taken in the direction of arrows 4-4 through plane 3 in FIG. 1.

In the example of the seat side airbag assembly 16 shown in FIGS. 3 and 4, the chute 18 is mounted to the frame 12. The chute 18 may define one or more holes (not shown) that align with the one or more holes in the frame 12. Fasteners 42 can extend through the holes of the chute 18 into the one or more aligned holes in the frame 12 to mount the chute 18 to the frame 12. For example, the fasteners 42 may be fixed to an inflator 56 that is attached to the airbag 20. The fasteners 42 can include bolts, clips, screws, Christmas tree fasteners and the like. The fasteners 42 may be formed from metal, e.g., steel, aluminum, etc., and other suitable materials.

Alternatively, fasteners may be integral with the chute 18, i.e., the fasteners and chute 18 may be formed simultaneously as a single continuous unit. As another example, the fasteners may be formed separately from the chute 18 and subsequently attached to the chute 18. Fasteners may be proximate a first end 44 of the chute 18. The fasteners may extend from the chute 18 through one or more aligned holes (not shown) in the frame 12 to mount the chute 18 to the frame 12.

The chute 18 can extend from the frame 12 to the cover 4. The chute 18 may be a unitary structure, made from fabric, plastic, metal, fiberglass or other suitable materials. Referring back to the example of the seat side airbag assembly 16 in FIG. 4, the chute 18 is mounted to the frame 12 proximate the first end 44 of the chute 18. A flange 46 of the chute 18 extends from the first end 44 to a second end 48. The chute 18 may have an inner side 50 that defines a cavity 52 between the first end 44 and the second end 48, The inner surface 30 of the cover 14 is attached to the chute 18. Specifically, the attachment 22, as referenced above, attaches the inner surface 30 of the cover 14 to the chute 18. Specifically, with reference to FIG. 5, one of the hook portion 26 or the loop portion 28 of the hook and loop fastener 24 may be mounted to an outer side 54 of the chute 18. Alternatively or additionally, the adhesive 32 may be applied to the chute 18, as shown in FIG. 6.

As set forth above, the attachment 22 fixes the inner surface 30 of the cover 14 to the chute 18. Specifically, the attachment 22 limits or prevents movement of the cover 14 relative to the chute 18 at the attachment 22 during inflation of the airbag 20 to encourage the airbag 20 to quickly rupture the cover 14. In other words, the attachment 22 removes play between the cover 14 and the chute 18 during inflation of the airbag 20 to focus the force of the inflating airbag 20 on the cover 14.

The airbag 20 is fixed to the chute 18 in any known manner. For example, as shown in FIGS. 3 and 4, the airbag 20 may be attached to the inflator 56. The inflator 56 can include threaded fasteners 42 that extend through holes (not shown) in the chute 18 into the one or more aligned holes in the frame 12 to mount the airbag 20 to the chute 18 and the chute to the frame 12. In FIGS. 1 and 4, the chute 18 extends between the airbag 20 and the cover 14 when the airbag 20 is in an uninflated position. The airbag 20 may, for example, be disposed between the first end 44 and the flange 46 of the chute 18. Referring to FIG. 2, the airbag 20 is shown deployed. Upon deployment, the airbag 20 inflates past the chute 18 and ruptures through the cover 14 to the inflated position. The chute 18 guides the direction of the inflation of the airbag 20 from the uninflated position to the inflated position.

The airbag 20 may be formed of any suitable type of material, e.g., from a woven polymer. For example, the airbag 20 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorganosiloxane.

Referring back to FIGS. 3 and 4, the seat side airbag assembly 16 may include the inflator 56 in fluid communication with an inflation chamber (not shown) of the airbag 20. The inflator 56 expands the airbag 20 with an inflation medium, such as a gas, to move the airbag 20 from the uninflated position to the inflated position. The inflator 56 may be, for example, a pyrotechnic inflator that uses a chemical reaction to drive the inflation medium into the airbag. Alternatively, the inflator 56 may be, for example, a cold-gas inflator that, when activated, ignites a pyrotechnic charge that creates an opening for releasing the pressurized inflation medium to the airbag 20 via a fill tube (not shown). Alternatively, the inflator 56 may be of any suitable type, for example, a hybrid inflator.

As shown in the FIGS. 1-6, the cover 14 can cover the frame 12, the seat side airbag assembly 16, and the foam and/or the other cushioning material 40 mounted on the frame 12, if any. The cover 14 may be formed from any suitable material, including fabrics such as cloth, vinyl, leather, etc., as well as combinations thereof.

The cover 14 may also be formed from one or more panels of material. For example, with reference to FIG. 4, the cover 14 can include a side panel 58, a front panel 60 and a back panel 62. The side panel 58 and the front panel 60 may be joined together by a seam 64. The seam 64 may be joined together with one or more break away stitches 72, or other known structures, materials and methods. With continued reference to FIG. 4, the second end 48 of the chute 18 may be attached to the inner surface 30 of the cover 14 adjacent the seam 64. The seam 64 faces in a vehicle-forward direction, and may be vertically extending.

The seam 64 is rupturable relative to the attachment 22 between the chute 18 and the cover 14. In other words, the seam 64 is designed to rupture in response to forces applied to the seam 64 by the airbag 20 during deployment of the airbag 20 from the uninflated positon to the inflated position. For example, the material type, size, and/or shape of the seam 64 may be designed to rupture in response to the inflation of the airbag 20. As the seam 64 ruptures, the airbag 20 extends through the seam 64 and outward from the cover 14.

FIGS. 5 and 6 show examples of the seat assembly process, among other things. In FIG. 5, the seat side air bag assembly 16 and foam and/or other cushioning material 40 are mounted to the frame 12. The loop potion 28 of the hook and loop fastener 24 is secured to the chute 18, and the hook portion 26 secured to the inner surface 30 of the cover 14. As set forth above, the hook portion 26 and the loop portion 28 may also be reversed, such that the hook portion 26 is secured to the chute 18 and the loop portion 28 secured to the cover 14. As the cover 14 is rolled down the seat back 34, the hook portion 26 and the loop portion 28 of the hook and loop fastener 24 may be sufficiently aligned such that the chute 18 and the cover 14 attach during the process.

Alternatively, as shown in FIG. 6, the seat side air bag assembly 16 and foam and/or other cushioning material 40 are mounted to the frame 12. The adhesive 32 is applied to the chute 18. Here again, as the cover 14 is rolled down the seat back 34 subsequent to the application of the adhesive 32, the adhesive 32 attaches the chute 18 and the cover 14 in the process.

As set forth above, the cover 14, and/or the seam 64 in the cover 14, are rupturable relative to the attachment 22 between the chute 18 and the cover 14. The airbag 20 can thereby break out of the uninflated position shown in FIG. 1, and, as shown in FIG. 2, deploy through the cover 14 and/or the seam 64 to an inflated position in a prompt and efficient manner.

Figure 7:
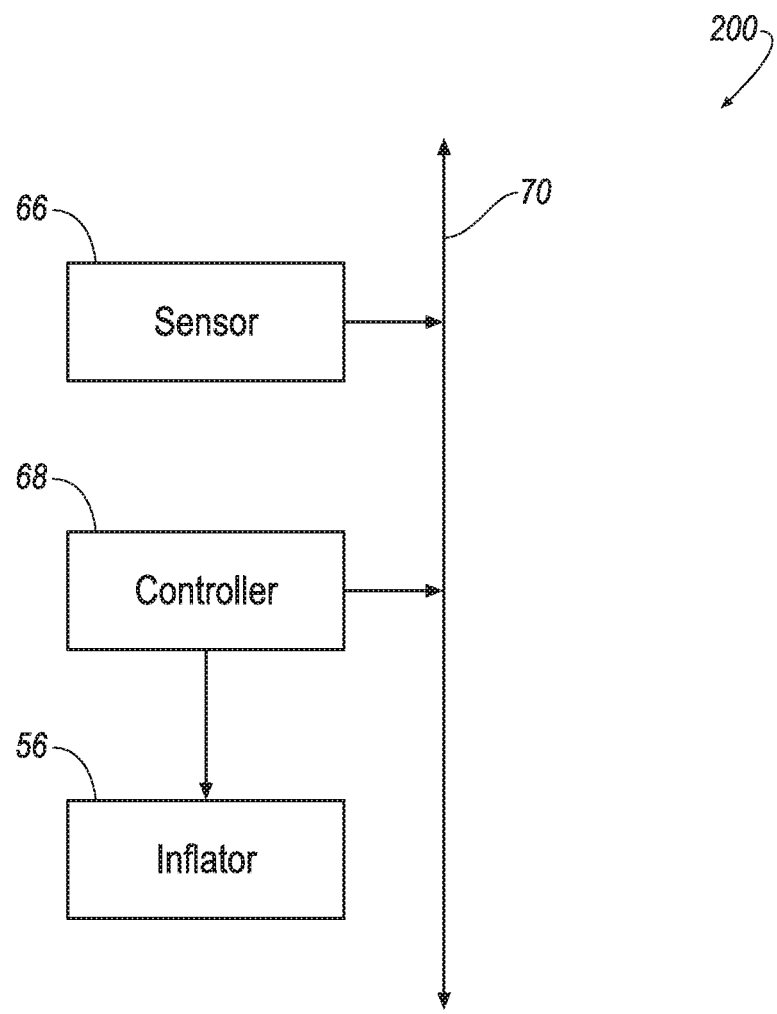
FIG. 7 is a schematic of a control system.

With reference now to FIG. 7, a vehicle (not shown) may include an impact sensing system 200. The impact sensing system 200 can include at least one sensor 66 for sensing an impact of the vehicle, a controller 68 in communication with the sensor 66, and the inflator 56 in communication with the airbag 20 for inflating the airbag 20 to the inflated position when the sensor 66 senses the impact of the vehicle. Alternatively or additionally to sensing impact, the impact sensing system 200 may be configured to sense impact prior to impact, i.e., pre-impact sensing. The sensor 66 may be of any suitable type, e.g., using radar, lidar, and/or a vision system. The vision system may include one or more cameras, CCD image sensors, and/or CMOS image sensor, etc.

The controller 68 may be a microprocessor-based processor. The controller 66 may include a processor, memory, etc. The memory of the controller 68 may store instructions executable by the processor. The sensor 66 is in communication with the controller 68 to communicate data to the controller 68. Based on the data communicated by the sensor 66, the controller 68 instructs the inflator 56 to activate.

The impact sensing system 200 may transmit signals through a communication network 70 (such as a controller area network (CAN) bus), Ethernet, and/or by any other wired or wireless communication network. The controller 68 may use information from the communication network 70 to control the activation of the inflator 56. The inflator 56 may be connected to the controller 68, as shown in FIG. 7, or may be connected directly to the communication network 70.

The disclosure has been described in an illustrative manner, and it is to he understood that the terminology used is intended to be in the nature of words of description rather than limitation. Many modifications and variations of the present disclosure are possible in light of the above teachings, and the invention may be practiced otherwise than as specifically described.

What is claimed is:

1. A vehicle seat comprising:
   a frame;
   a cover supported by the frame;
   a chute mounted directly to the frame and extending from the frame to the cover, the chute having a unitary structure;
   an airbag fixed to the chute with the chute extending between the airbag and the cover; and
   the chute including an adhesive directly attached to an inner surface of the cover.

2. The vehicle seat of claim 1 further comprising a seam in the cover.

3. The vehicle seat of claim 2, wherein the seam is vertically extending.

4. The vehicle seat of claim 1, wherein the seam is separable relative to the adhesive between the inner surface of the cover and the chute.

5. The vehicle seat of claim 1, wherein the chute includes a first end fixed to the frame and a flange extending from the first end to the cover, the airbag being disposed between the first end and the flange.

6. The vehicle seat of claim 5, wherein the chute is curved defining a cavity between the first end and the flange, the airbag being disposed in the cavity.

7. The vehicle seat of claim 1, wherein the chute extends from the frame to a second end, and wherein the cover includes a seam adjacent the second end.

8. The vehicle seat of claim 7, wherein the second end of the chute includes the adhesive attached to the inner surface of the cover.

9. The vehicle seat of claim 1, wherein the seam is designed to break when the airbag is inflated to an inflated position.

10. The vehicle seat of claim 1, wherein the seam faces a vehicle-forward direction.

11. The vehicle seat of claim 1, wherein the adhesive is a heat sensitive adhesive.

12. The vehicle seat of claim 1, wherein the adhesive is a pressure sensitive adhesive.

* * * * *